(12) United States Patent
Luna et al.

(10) Patent No.: US 10,537,864 B2
(45) Date of Patent: Jan. 21, 2020

(54) AUTOMATIC HEIGHT ADJUSTING MIXING ROBOT

(71) Applicants: Jose Luna, Midland, TX (US); Burl Fuller, Midland, TX (US); Jerry Fuller, Midland, TX (US)

(72) Inventors: Jose Luna, Midland, TX (US); Burl Fuller, Midland, TX (US); Jerry Fuller, Midland, TX (US)

( * ) Notice: Subject to any disclaimer, the term of this patent is extended or adjusted under 35 U.S.C. 154(b) by 0 days.

(21) Appl. No.: 16/371,452

(22) Filed: Apr. 1, 2019

(65) Prior Publication Data

US 2019/0224636 A1 Jul. 25, 2019

Related U.S. Application Data

(63) Continuation-in-part of application No. 15/620,873, filed on Jun. 13, 2017, now Pat. No. 10,245,723.

(51) Int. Cl.

| | |
|---|---|
| *B01F 15/02* | (2006.01) |
| *B01F 13/00* | (2006.01) |
| *B01F 15/04* | (2006.01) |
| *B65G 33/14* | (2006.01) |
| *G05D 11/13* | (2006.01) |
| *B60P 1/42* | (2006.01) |
| *B66D 1/60* | (2006.01) |
| *E21B 37/06* | (2006.01) |
| *B01F 3/18* | (2006.01) |
| *B01F 15/00* | (2006.01) |
| *E21B 41/02* | (2006.01) |

(52) U.S. Cl.
CPC .......... *B01F 15/0412* (2013.01); *B01F 3/188* (2013.01); *B01F 13/0032* (2013.01); *B01F 15/00772* (2013.01); *B01F 15/0289* (2013.01); *B01F 15/0495* (2013.01); *B60P 1/42* (2013.01); *B65G 33/14* (2013.01); *B66D 1/60* (2013.01); *E21B 37/06* (2013.01); *E21B 41/02* (2013.01); *G05D 11/13* (2013.01); *B01F 2215/0081* (2013.01)

(58) Field of Classification Search
CPC ........ B25J 9/1602; B25J 9/102; B25J 9/0078; B25J 9/0021; B66F 7/02; B66F 9/063; B65D 88/30; B65D 88/32; B01F 13/0032; B01F 15/00772; B01F 15/0288; B01F 15/0289
USPC ................................................ 366/26, 156.1
See application file for complete search history.

(56) References Cited

U.S. PATENT DOCUMENTS

| | | | | |
|---|---|---|---|---|
| 5,785,420 A | * | 7/1998 | Schuff ................. | B01F 7/00708 366/20 |
| 6,666,573 B2 | * | 12/2003 | Grassi .................. | B01F 5/0473 366/150.1 |
| 6,817,747 B2 | * | 11/2004 | Preisser ................. | B28C 7/162 366/156.1 |
| 10,245,723 B2 | * | 4/2019 | Luna ..................... | B25J 9/1602 |
| 2018/0354123 A1 | * | 12/2018 | Luna ..................... | B25J 9/1602 |

* cited by examiner

*Primary Examiner* — Charles Cooley
(74) *Attorney, Agent, or Firm* — Nolte Intellectual Property Law Group (57) ABSTRACT

An automatic height adjusting robot has a base frame, an L shaped lifting base assembly, a lifting frame, a hoist assembly, an automated mixing assembly, a power inlet, and a screw conveyor. The automatic height adjusting robot computes controlled volumetric ratios of dry chemicals while connected to a production well.

11 Claims, 9 Drawing Sheets

AUTOMATIC HEIGHT ADJUSTING MIXING ROBOT

CROSS REFERENCE TO RELATED APPLICATION

This is a Continuation In Part of U.S. patent application Ser. No. 15/620,873 filed on Jun. 13, 2017 entitled: "PORTABLE DRY CHEMICAL DELIVERY ROBOT." This patent application reference is hereby incorporated in its entirety.

FIELD

The present embodiment generally relates to automatic height adjusting robot computing controlled volumetric ratios of dry chemicals connected to a well.

BACKGROUND

A need exists for an automated device for blending dry chemicals and determining presenting the changed volumetric ratio without a need for human interaction.

A further need exists for a device, which can be adjusting to the height of different pieces of equipment.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiments relate to an automatic height adjusting robot computing controlled volumetric ratios of dry chemicals connected to a well.

The automatic height adjusting robot computing controlled volumetric ratios of dry chemicals connected to a well includes a first parallel support member and second parallel support member.

A cross member is connected between the first and second parallel support members.

A first pivoting wheel is aligned with a first fixed wheel mounted on the first parallel support member.

A second pivoting wheel is aligned with a second fixed wheel mounted on the second parallel support member.

An L shaped lifting base assembly is removably disposed on the base frame.

The L shaped lifting base assembly contains a base plate, a back plate mounted at an angle from 80 degrees to 100 degrees to the base plate, a pair of sliding engagement extensions mounted to the back plate, and a lifting eyelet mounted to the back plate between the pair of sliding engagement extensions.

A lifting frame is mounted to the base frame at an angle from 80 degrees to 100 degrees from the base plane configured to receive the pair of sliding engagements forming a secure connection with the L shaped lifting base.

A hoist assembly engages the lifting eyelet to raise and lower the L shaped lifting base assembly off the base frame.

An automated mixing assembly is fastened to the L shaped lifting base. The automated mixing assembly includes an outer housing secured to the lifting frame, a tapered mixing chamber installed in the outer housing, and a mixing controller.

The mixing controller includes a processor connected to a display and a computer readable medium.

The computer readable medium includes a volumetric ratio model providing zero-lag estimates of volumetric ratios of dry chemicals to form a volumetric ratio of dry chemicals automatically; computer instructions to instruct the processor to present a feed rate for dry chemicals entering the automated mixing assembly using a first volumetric ratio of dry chemicals from the volumetric ratio model to the display; computer instructions to instruct the processor to dynamically re-compute the volumetric ratio of dry chemicals automatically and present the changed volumetric ratio to the display by changing at least one of: a quantity of a first dry chemicals flowing into the tapered mixing chamber, a quantity of a second dry chemicals flowing into the tapered mixing chamber, a preset flow rate of chemicals flowing out of the tapered mixing chamber.

In embodiments, the automatic height adjusting robot has a power inlet connected to a power supply engaging the outer housing and electrically connected to the mixing controller and a screw conveyor extending from the tapered mixing chamber to an outlet.

The present embodiments prevent a person from coming into contact with silica dust, which may cause severe health issues and casualties.

The present embodiments take the danger of having a person in the high pressure danger zone/area.

The present embodiments keep a person from coming into direct contact with corrosive/toxic dust from dry chemical.

Automation of the present embodiment makes the dosing precise for a well.

The present embodiment is more cost effective because it eliminates the need of having two individuals at a location where dry chemicals could explode.

The following terms are used herein:

The term "automated mixing assembly" refers to an assembly with a mixing controller for forming a dry blend of chemicals automatically. The mixing assembly is accessible through an outer housing and attached to a tapered mixing chamber.

The term "base frame" refers to a frame with parallel support members, a cross member connected between two parallel support members with pivoting and fixed wheels mounted on the parallel support members.

The term "base plate" refers to a non-deforming rigid plate having a thickness from ⅛ inch to ¾ inch. In embodiments it can be made from metal or reinforced polymer.

The base plate can be various shapes including square, rectangular. The base plate may be coated. The base plate can be from three to five feet in length and three to five feet in width.

The term "back plate" refers to a non-deforming rigid plate having a thickness from ⅛ inch to ¾ inch mounted at an angle from 80 degrees to 100 degrees, such as a right angle, onto the base plate such as by welding. In embodiments back plate can be made from metal or reinforced polymer. The back plate can be various shapes including square, rectangular. The back plate may be coated. The back plate can be from three to six inches in height and three to five feet in length.

The term "computer readable medium" refers to a non-transitory computer readable medium.

The term "hoist assembly" refers to an assembly engaging the lifting eyelet, which is used to raise and lower an automated mixing assembly fastened to an L shaped lifting base assembly off a base frame. The hoist assembly can have a sheave mounted to the crown, a winch mounted between the first and second lifting members, which can be manual or motorized. A cable, which can be wire rope, can be attached on one end to the winch running through the sheave removably secured to the lifting eyelet.

The term "L shaped lifting base assembly" refers to an assembly with a base plate, a back plate, sliding engagement extensions, and a lifting eyelet. The L shaped lifting assembly raises and lowers the automatic height adjusting robot.

The term "lifting frame" refers to a frame that connects with the L shaped lifting base assembly and guides the automatic height adjusting robot up and down to adjust the height to distribute chemicals onto a conveyor belt, a tank, or container.

The term "lifting eyelet" can refer to an eyelet mounted to the back plate between the pair of sliding engagement extensions for engaging the hoist to raise and lower the L shaped lifting assembly. The lifting eyelet can be made from ⅛ to ¾ inch steel rod and have a hole for engaging a lifting hook that has a diameter from ½ inch to an inch in diameter.

The term "mixing controller" refers to a controller with a processor such as a computer with memory, connected to a display. The memory of the controller is a computer readable media that contains a volumetric ratio model for providing zero-lag estimates of volumetric ratios of dry chemicals to form a volumetric ratio of dry chemicals automatically.

The term "outer housing" refers to a waterproof housing that protects the tapered mixing chamber and mixing controller.

The term "power inlet" refers to waterproof electrical outlet connected to the outer housing.

The term "processor" can refer to a programmable logic controller, a microcontroller, a microcontroller, or any other programmable computing device. The processor can control the automatic height adjusting robot remotely or locally.

The term "screw conveyer" refers to a conveyer extending from the tapered mixing chamber to a conduit to flow the chemicals into a production well, tank, or any other container or apparatus. The screw conveyor can be an auger.

The term "sliding engagement extensions" can refer extensions mounted to and rise in a parallel plane to the back plate. The sliding engagement extensions can have a length of from one inch to three inches, and are both attached on the same side of the back plate in a spaced apart relationship from one foot to two feet, such as one and one-half feet. The sliding engagement extensions have a thickness of from ⅛ inch to one inch.

The term "tapered mixing chamber" refers to an inner housing that is located in and connected to an outer housing of the automated mixer assembly for receiving dry chemicals and holding the blend of dry chemicals formed inside the tapered mixing chamber.

The term "wheel" refers to polyamide wheels or rubber wheels with a diameter from 3 inches to 5 inches.

Figure 1:
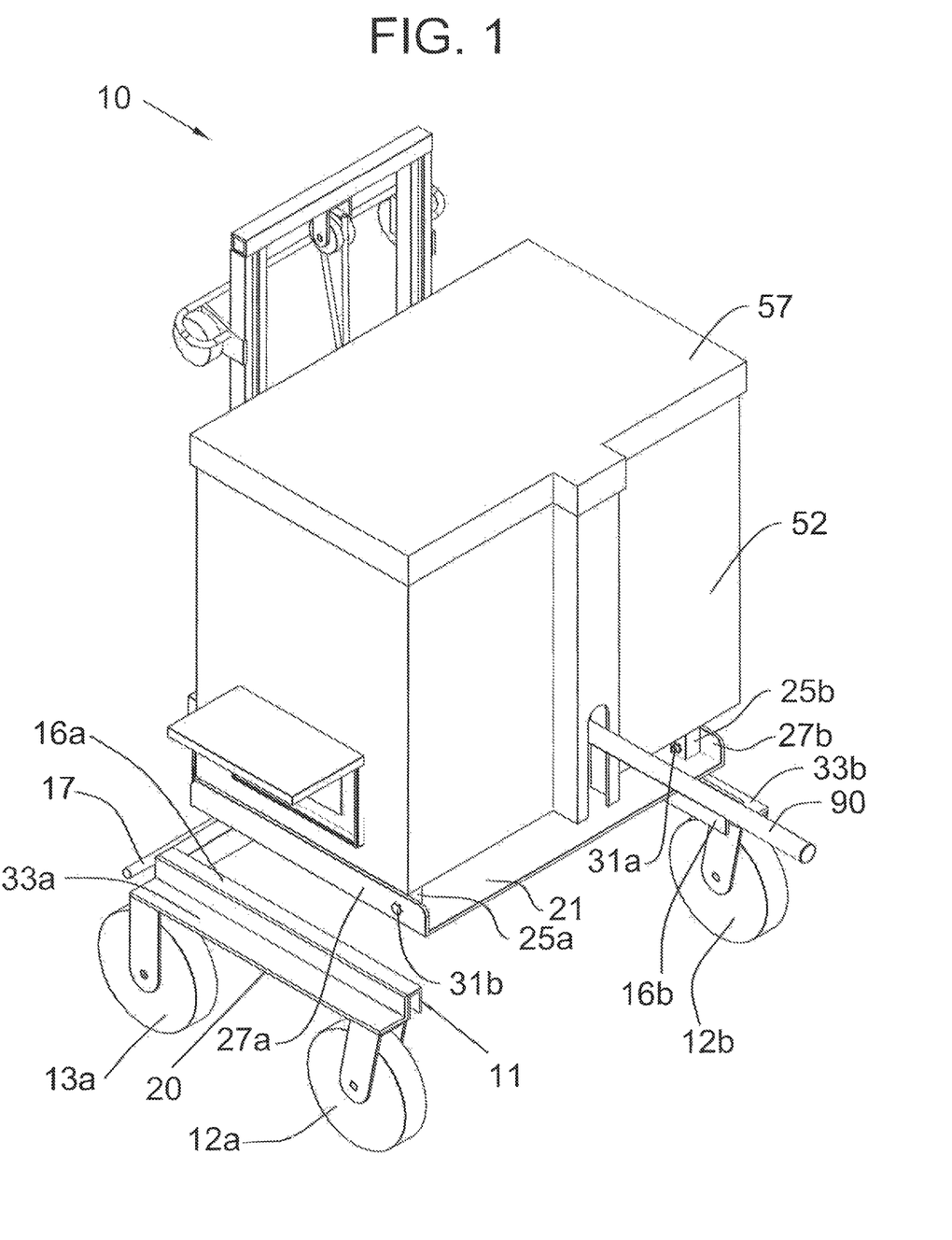
FIG. 1 depicts an overview of the automatic height adjusting robot according to one or more embodiments.

Now turning to the Figures, FIG. 1 depicts an overview of the automatic height adjusting robot 10 for computing controlled volumetric ratios of dry chemicals connected to a well.

The automatic height adjusting robot 10 has a base frame 11.

The base frame 11 has a first parallel support member 16a and second parallel support member 16b.

In embodiments, a cross member 17 is connected between the first and second parallel support members 16a and 16b.

A first pivoting wheel 12a and is aligned with a first fixed wheel 13a, mounted on the first parallel support member 16a; and a second pivoting wheel 12b is aligned with a second fixed wheel, mounted on the second parallel support member 16b.

In embodiments, a first wheel support member 33a is mounted between the first parallel support member 16a and a first pivoting wheel 12a and a first fixed wheel 13a, and a second wheel support is member 33b mounted between the second parallel support member 16b and the second pivoting wheel 12b and a second fixed wheel.

An outer housing 52 of an automated mixing assembly is secured to the L shaped lifting base 20.

The outer housing 52 incorporates an outer lid 57 for closing the outer housing 52.

A plurality of legs 25a and 25b are shown extending from the outer housing 52 toward a base plate 21 for fastening the outer housing 52 to an L shaped lifting base 20.

In embodiments, a first side plate 27a and a second side plate 27b are mounted in parallel and connected on opposite sides of the base plate 21. Each side plate 27a and 27b is configured to support and secure to at least two legs 25a and 25b of the outer housing 52.

A plurality of bolts 31a-31d secures the plurality of legs to the first and second side plates 27a and 27b.

In embodiments, a screw conveyor 90 is shown for flowing chemicals into the production well.

Figure 2:
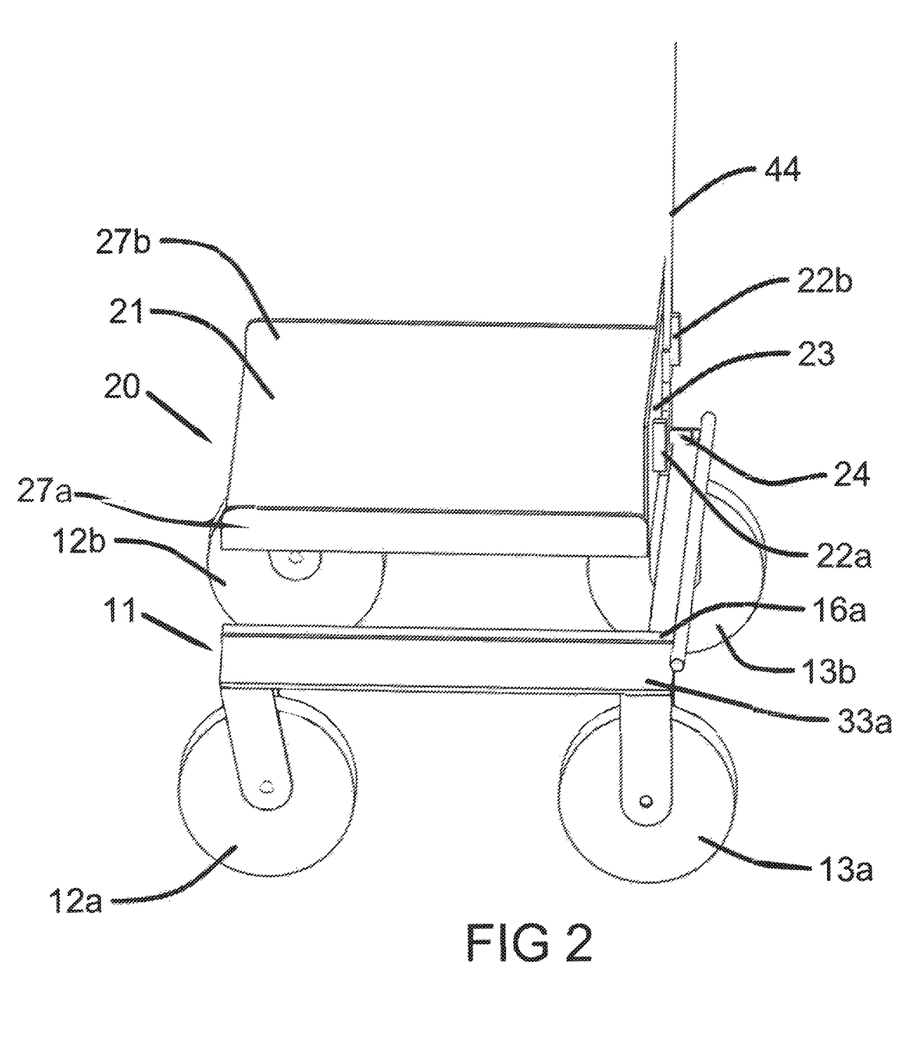
FIG. 2 depicts the L shaped lifting base according to one or more embodiments.

FIG. 2 depicts L shaped lifting base 20.

The automatic height adjusting robot includes an L shaped lifting base assembly 20 removably disposed on the base frame 11.

The base frame 11 is shown incorporating a first wheel support member 33a mounted between the first parallel support member 16a and a first pivoting wheel 12a and a first fixed wheel 13a, a second pivoting wheel 12b, and a second fixed wheel 13b.

The L shaped lifting base assembly 20 includes a base plate 21. A back plate 23 is mounted at an angle from 80-100 degrees to the base plate 21.

A first side plate 27a and a second side plate 27b are mounted in parallel and connected on opposite sides of the base plate 21.

A pair of sliding engagement extensions 22a and 22b are mounted to the back plate 23.

A lifting eyelet 24 is mounted to the back plate 23 between the pair of sliding engagement extensions 22a and 22b.

In embodiments, a cable 44 is shown extending to the lifting eyelet 24.

Figure 3A:
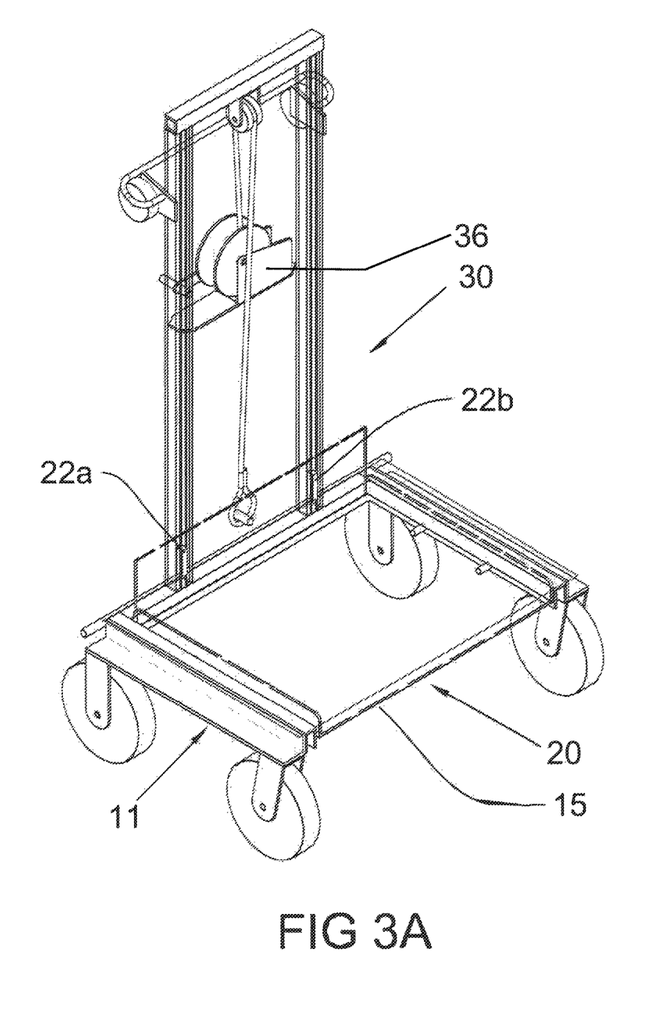
FIGS. 3A and 3B depict a lifting frame according to one or more embodiments.
Figure 3B:
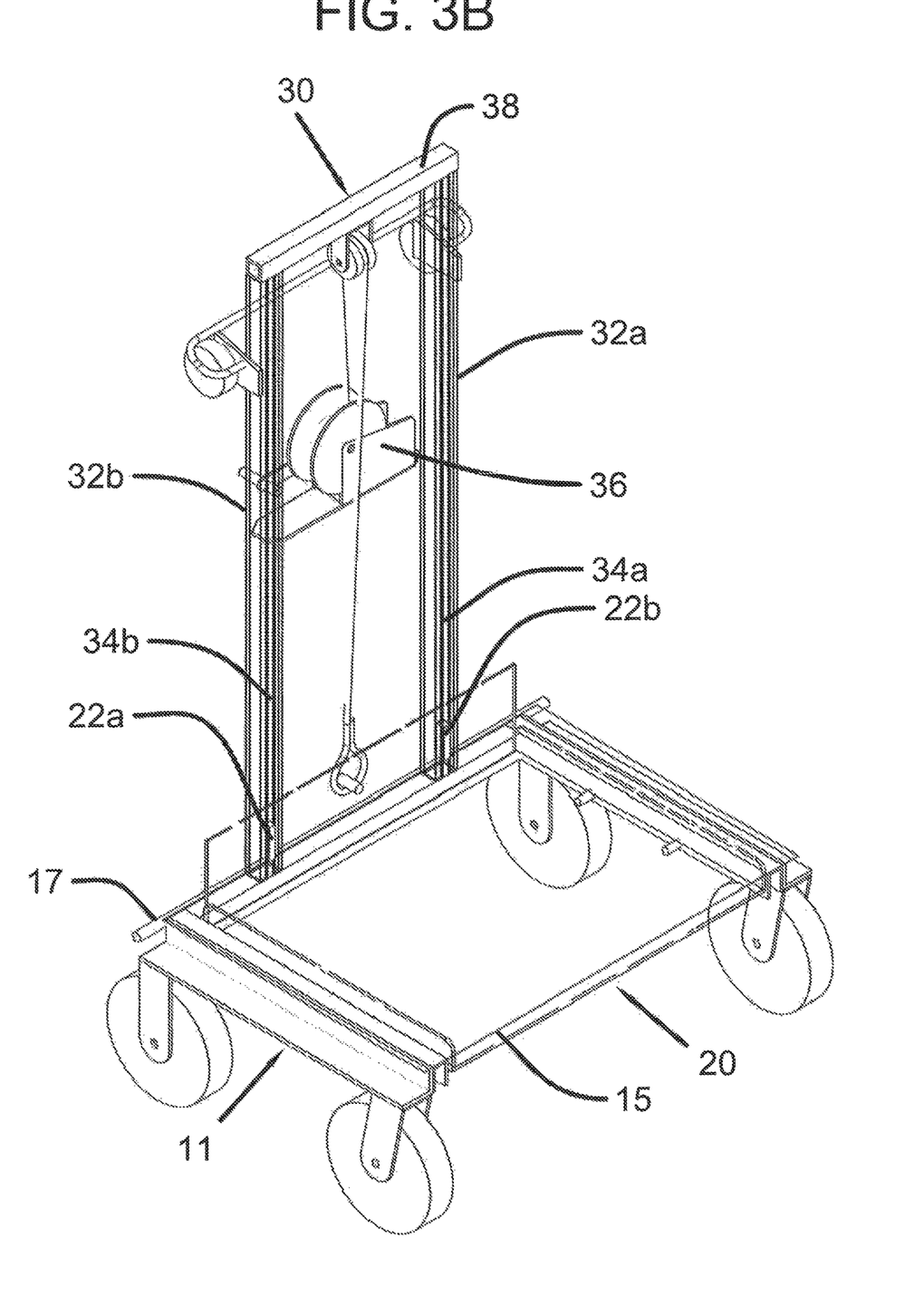

FIGS. 3A and 3B depict a lifting frame 30.

A lifting frame 30 is mounted to the base frame 11 at an angle from 80 to 100 degrees from the base plane 15.

The lifting frame 30 includes a crown 38, a first lifting member 32a with a first groove 34a connected to the cross member 17 and a second lifting member 32b with a second groove 34b connected to the cross member 17 in a spaced apart relationship and wherein each groove 34a and 34b is adapted to receive one of the pair of sliding engagements 22a and 22b.

A hoist assembly 36 engages the lifting eyelet 24 to raise and lower the L shaped lifting base assembly 20.

Figure 4A:
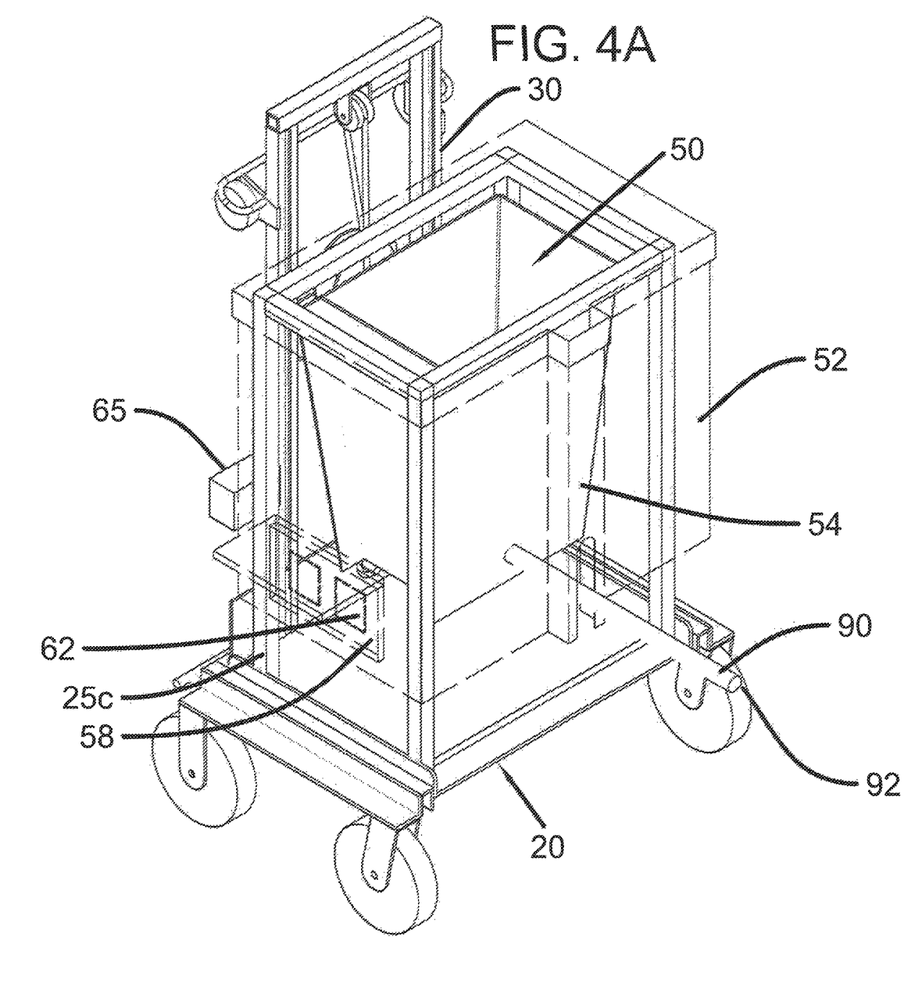
FIGS. 4A and 4B depict an automated mixer assembly according to one or more embodiments.
Figure 4B:
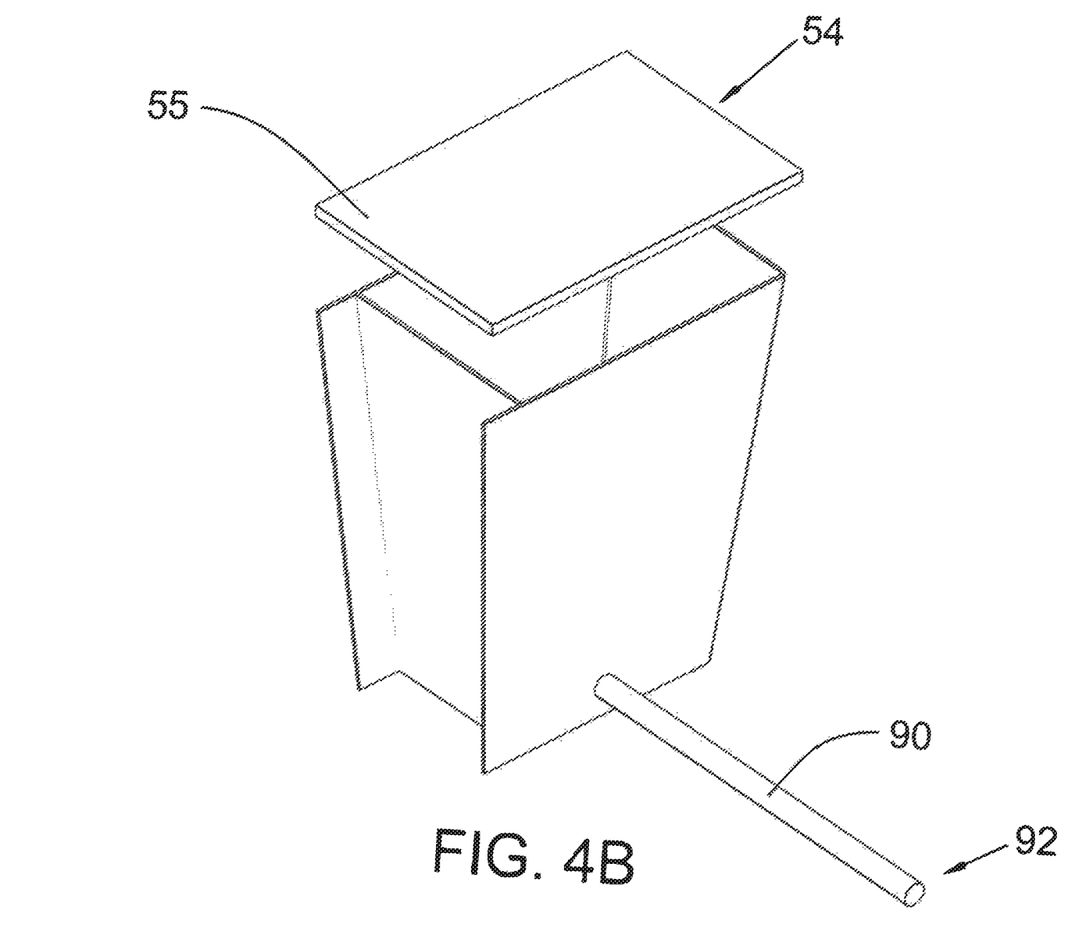

FIGS. 4A and 4B depict an automated mixing assembly 50.

The automated mixing assembly 50 is fastened to the L shaped lifting base 20.

The automated mixing assembly 50 contains an outer housing 52 secured to the L shaped lifting base assembly.

A tapered mixing chamber 54 is installed in the outer housing 52 of the automated mixing assembly 50.

In embodiments, an inner lid 55 is mounted over the tapered mixing chamber 54.

A screw conveyor 90 extends from the tapered mixing chamber 54 to an outlet 92.

In embodiments, the automated mixing assembly includes a mixing controller 58 with a display 62.

A power inlet 65 engages the outer housing 52 and is electrically connected to the mixing controller 58.

In embodiments, the automated mixing assembly 50 is removably fastened to the L shaped lifting base assembly 20 with bolts.

A leg 25a is shown extending from the outer housing 52.

In embodiments, the outer housing 52 and an L shaped lifting base assembly 20 are an integral one piece assembly.

Figure 5:
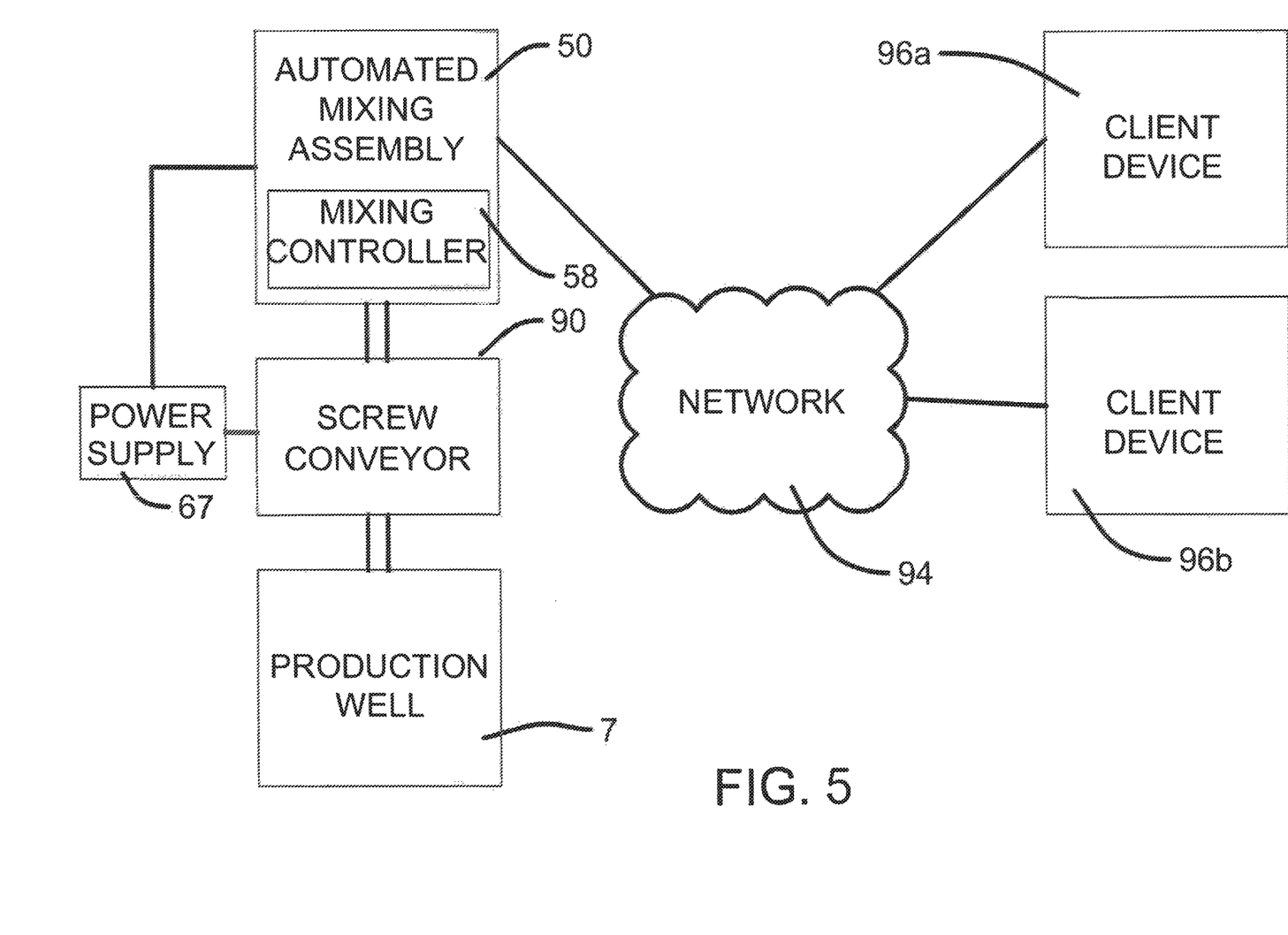
FIG. 5 depicts the automatic height adjusting robot in communication with a network.

FIG. 5 depicts the automated mixing assembly 50 with mixing controller 58 and screw conveyor 90 of the automatic height adjusting robot in communication with network. 94.

In embodiments, a plurality of client devices 96a and 96b are in communication with the network 94 for automatically controlling volumetric ratios of dry chemicals flowing into a production well 7.

The automated mixing assembly 50 and screw conveyor 90 can be connected to a power supply 67.

Figure 6:
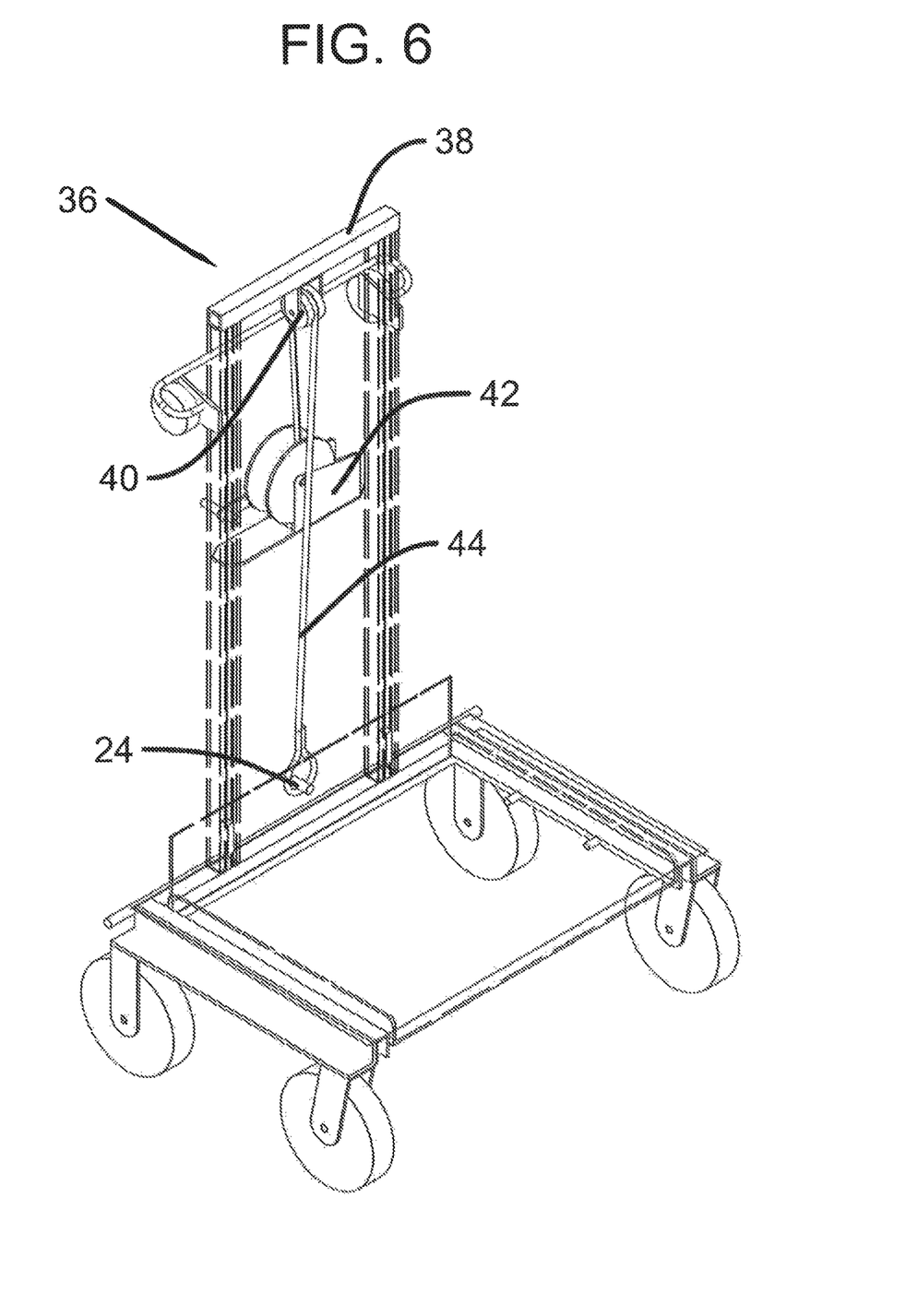
FIG. 6 depicts the hoist assembly according to one or more embodiments.

FIG. 6 depicts the hoist assembly.

The automatic height adjusting robot includes the hoist assembly 36.

The hoist assembly 36 includes a crown 38 mounted between the first and second lifting members.

A sheave 40 is mounted to the crown 38.

In embodiments, the hoist assembly 36 includes a winch 42, which is mounted to at least one lifting member.

A cable 44 extends from the winch 42 through the sheave 40 to the lifting eyelet 24.

Figure 7:
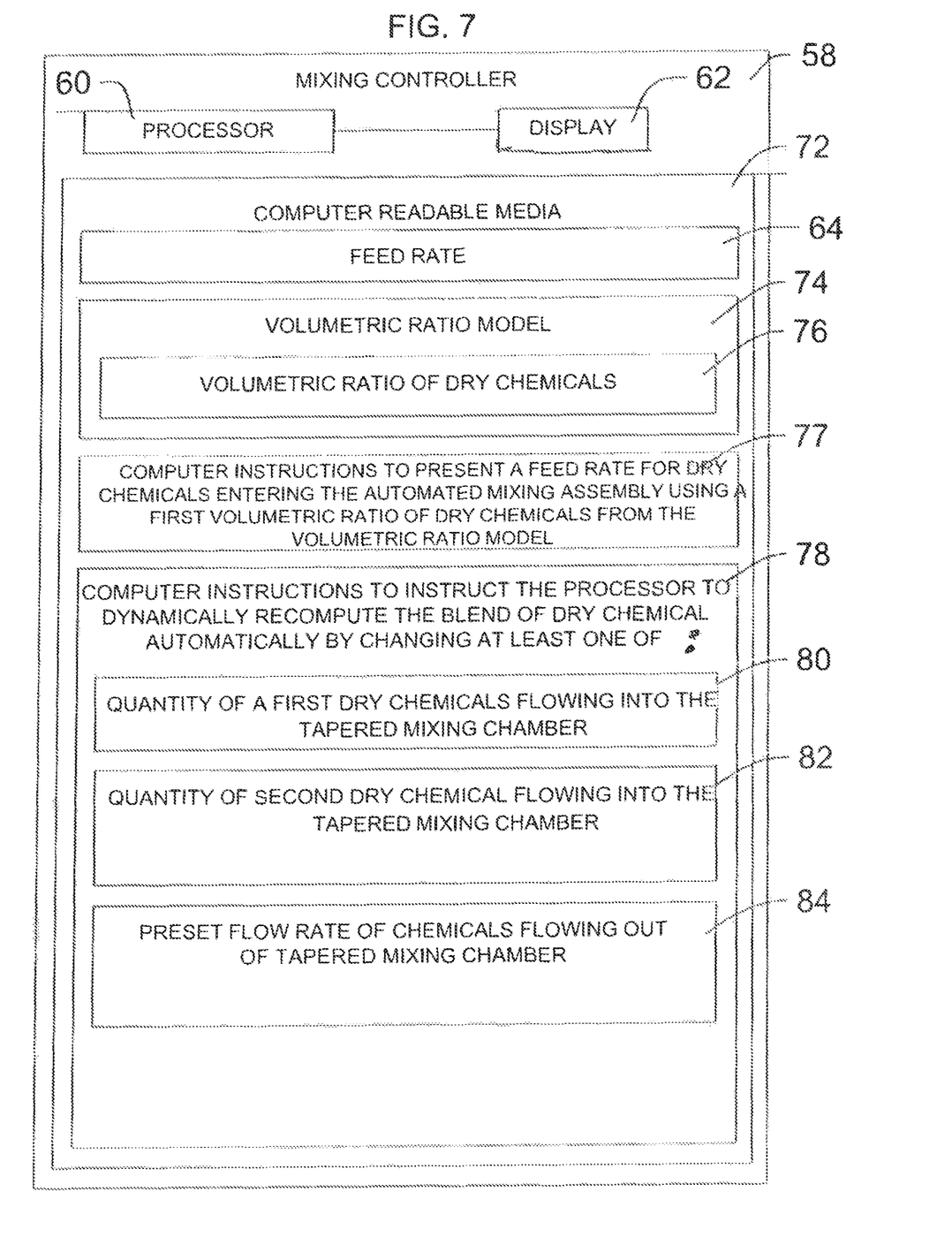
FIG. 7 depicts a mixing controller according to one or more embodiments.

FIG. 7 depicts a mixing controller.

The automated mixing assembly includes a mixing controller 58.

The mixing controller contains a processor 60 connected to a display 62 and in communication with a computer readable medium 72.

The computer readable medium 72 contains a feed rate 64 and a volumetric ratio model 74 with volumetric ratio of dry chemicals 76.

The volumetric ratio model 74 provides zero-lag estimates of volumetric ratios of dry chemicals to form a volumetric ratio of dry chemicals automatically.

In embodiments, the computer readable medium 72 contains computer instructions 77 to instruct the processor to present a feed rate for dry chemicals entering the automated mixing assembly using a first volumetric ratio of dry chemicals from the volumetric ratio model to the display.

Additionally, the computer readable media contains a quantity of a first dry chemical 80 flowing into the tapered mixing chamber, a quantity of a second dry chemical 82 flowing into the tapered mixing chamber, and a preset flow rate 84 of chemicals flowing out of the tapered mixing chamber.

In embodiments, the computer readable media 72 includes computer instructions 78 to instruct the processor to dynamically re-compute the volumetric ratio of dry chemicals automatically and present the changed volumetric ratio to the display by changing at least one of: a quantity of a first dry chemical flowing in to the tapered mixing chamber, a quantity of a second dry chemical flowing in to the tapered mixing chamber, and a preset flow rate of chemical flowing out of the tapered mixing chamber.

EXAMPLES

Example 1

The height adjusting robot has a base frame with a first parallel support member 16a and second parallel support member 16b and a cross member 17 connected between the first and second parallel support members forming a square 4 feet wide by 4 feet long.

A first pivoting wheel 12a, having a diameter of four inches, is attached to the first parallel support member. A first fixed wheel 13a, having a diameter of four inches, is also mounted on the first parallel support member 16a in a spaced apart relationship, such as 3.8 feet apart.

A second pivoting wheel 12b, having a diameter of four inches, is attached to the second parallel support member. A second fixed wheel 13b, having a diameter of four inches, is also mounted on the second parallel support member 16a in a spaced apart relationship, such as 3.8 feet apart.

An L shaped lifting base assembly 20 that is slightly smaller in width from the base frame is removably disposed on the base frame 11.

In this example, the L shaped lifting base assembly has a base plate 21 made from steel, that can be ¼ inch in thickness. The base plate can be solid or perforated to improve weight and transport, but non-deformable when supporting an entire load of dry chemicals.

The L shaped lifting base assembly base plate fits over the base frame without falling through the base frame.

The L shaped lifting base assembly has a back plate 23 mounted at an angle from 80-100 degrees to the base plate. The back plate can be from five inches to six inches in height and have a thickness of one-fourth to one-half inch and made from steel.

In embodiments, the base plate and the back plate can be made from a strong, non-deforming polymer such as a reinforced plastic sheet.

A pair of sliding engagement extensions 22a and 22b is mounted to and rise in a parallel plane to the back plate. The sliding engagement extensions can have a length of from one inch to three inches, and are both attached on the same side of the back plate in a spaced apart relationship, such as a few feet.

A lifting eyelet 24 is mounted to the back plate between the pair of sliding engagement extensions. The lifting eyelet can be made from one-half inch steel rod and have a hole for engaging a lifting hook that has a diameter from one-half inch to an inch in diameter.

A lifting frame 30 is mounted to the base frame 11 at an angle of 90 degrees from a base plane 15 of the base plate.

The lifting frame is configured to receive the pair of sliding engagements 22a and 22b into grooves in the lifting frame to form a secure connection with the L shaped lifting base 20.

In this example, the lifting frame has a crown 38 and first and second lifting members 32. The first and second lifting members 32 engage a cross member 17 of the base frame 11. The crown can be from five feet to six feet from the cross member. The lifting members can be made from two-inch channel iron.

A hoist assembly 36 engaging the lifting eyelet 24 is used to raise and lower the L shaped lifting base assembly 20 off the base frame 11.

The hoist assembly 35 can have a sheave 40 mounted to the crown 38 and a winch 42 mounted between the first and second lifting members 32a and 32b, which can be manual or motorized. A cable 44, which can be wire rope, can be attached on one end to the winch 42 running through the sheave 40 removably secured to the lifting eyelet 24.

In this example, the automated mixing assembly 50 is a box within a box.

The automated mixing assembly has an outer housing 52 with four optional legs fastened to the side plates of the L shaped lifting base 20.

The outer housing can have an optional lid, and is just big enough to hold a tapered mixing chamber 54 installed in the outer housing.

The outer housing is both waterproof and provides a secondary safety feature to control power explosions, and protect people near the robot.

The automated mixing assembly has a mixing controller with a display accessible through the outer housing and attached to the tapered mixing chamber 54.

The mixing controller has a processor 60 such as a computer with memory, connected to a display 62 and receiving power from a power inlet. The memory of the controller is a computer readable media that contains a volumetric ratio model 74 providing zero-lag estimates of volumetric ratios of dry chemicals to form a volumetric ratio of dry chemicals 76 automatically. An exemplary volumetric ratio of dry chemical can be 30 pounds of scale inhibitor to 15 pounds of corrosion inhibitor.

The computer readable media also has computer instructions 77 to instruct the processor to present a feed rate for dry chemicals entering the automated mixing assembly using a first volumetric ratio of dry chemicals from the volumetric ratio model to the display. For example, the feed rate of the scale inhibitor to the corrosion inhibitor in a 2:1 volumetric ratio can be ½ pound per hour for a specific production well known as the Jose Well in the Permian formation of West Texas. The feed rate and the initial volumetric ratios can be presented on the display using information in the model.

The computer readable media also contains computer instructions 78 to instruct the processor 60 to dynamically re-compute the volumetric ratio of dry chemicals automatically and present the changed volumetric ratio to the display by changing at least one of: a quantity of a first dry chemicals 80 flowing into the tapered mixing chamber such as scale inhibitor, a quantity of a second dry chemicals 82 flowing into the tapered mixing chamber, such as corrosion inhibitor, and a preset flow rate 84 of chemicals flowing out of the tapered mixing chamber of one-fourth pound per hour.

The automated mixing assembly has a power inlet connected to a power supply, which can be a generator near the robot, engaging the outer housing and electrically connected to the mixing controller.

The embodiments include a screw conveyor such as an auger, connected to the power supply and extending from the tapered mixing chamber 54 to a conduit to flow the chemicals into the production well.

The embodiments can uniquely move the automated mixing assembly vertically enabling the auger to connect linearly with preexisting fractionation equipment connected to a production well, providing a safer robot preventing environmental spills and toxic exposure due to a limited number of connection parts and joints.

The embodiments can be moved easily between wells for different jobs, and the model allows for storage of many types of dry chemicals to accommodate different types of fluids needed for different wells.

Example 2

The height adjusting robot of Example 1 has a mixing controller with a display accessible through the outer housing and attached to the tapered mixing chamber 54.

The mixing controller has a processor 60 such as a computer with memory, connected to a display 62 and receiving power from a power inlet. The memory of the controller is a computer readable media that contains a volumetric ratio model 74 providing zero-lag estimates of volumetric ratios of dry chemicals to form a volumetric ratio of dry chemicals 76 automatically. An exemplary volumetric ratio of dry chemical can be 15 pounds of scale inhibitor to 15 pounds of paraffin inhibitor.

The computer readable media also has computer instructions 77 to instruct the processor to present a feed rate for dry chemicals entering the automated mixing assembly using a first volumetric ratio of dry chemicals from the volumetric ratio model to the display. For example, the feed rate of the scale inhibitor to the paraffin inhibitor in a 1:1 volumetric ratio can be 15 pounds per hour for a specific production well known as the Jose Well in the Permian formation of West Texas. The feed rate and the initial volumetric ratios can be presented on the display using information in the model.

The computer readable media also contains computer instructions 78 to instruct the processor 60 to dynamically re-compute the volumetric ratio of dry chemicals automatically and present the changed volumetric ratio to the display by changing at least one of: a quantity of a first dry chemicals 80 flowing into the tapered mixing chamber such as scale inhibitor, a quantity of a second dry chemicals 82 flowing into the tapered mixing chamber, such as paraffin inhibitor, and a preset flow rate 84 of chemicals flowing out of the tapered mixing chamber of 15 pounds per hour.

The automated mixing assembly has a power inlet connected to a power supply, which can be a generator near the robot, engaging the outer housing and electrically connected to the mixing controller.

The embodiments include a screw conveyor such as an auger, connected to the power supply and extending from the tapered mixing chamber 54 to a conduit to flow the chemicals onto a conveyor belt, which is connected to blender. The chemicals are then transferred from the blender through pumps and into the production well.

The embodiments can be moved easily between wells for different jobs, and the model allows for storage of many types of dry chemicals to accommodate different types of fluids needed for different wells.

Example 3

The height adjusting robot of Example 1 has a mixing controller with a display accessible through the outer housing and attached to the tapered mixing chamber 54.

The mixing controller has a processor 60 such as a computer with memory, connected to a display 62 and receiving power from a power inlet. The memory of the controller is a computer readable media that contains a volumetric ratio model 74 providing zero-lag estimates of volumetric ratios of dry chemicals to form a volumetric ratio of dry chemicals 76 automatically. An exemplary volumetric ratio of dry chemical can be 5 pounds of scale inhibitor to 10 pounds of corrosion inhibitor.

The computer readable media also has computer instructions 77 to instruct the processor to present a feed rate for dry chemicals entering the automated mixing assembly using a first volumetric ratio of dry chemicals from the volumetric ratio model to the display. For example, the feed rate of the scale inhibitor to the corrosion inhibitor in a 1:2 volumetric ratio can be 1 pound per hour for transferring into a mixing vat. The feed rate and the initial volumetric ratios can be presented on the display using information in the model.

The computer readable media also contains computer instructions 78 to instruct the processor 60 to dynamically re-compute the volumetric ratio of dry chemicals automatically and present the changed volumetric ratio to the display by changing at least one of: a quantity of a first dry chemicals 80 flowing into the tapered mixing chamber such as scale inhibitor, a quantity of a second dry chemicals 82 flowing into the tapered mixing chamber, such as corrosion inhibitor, and a preset flow rate 84 of chemicals flowing out of the tapered mixing chamber of 1 pound per hour.

The automated mixing assembly has a power inlet connected to a power supply, which can be plugged into a 110 AC power outlet, engaging the outer housing and electrically connected to the mixing controller.

The embodiments include a screw conveyor such as an auger, connected to the power supply and extending from the tapered mixing chamber 54 to a conduit to flow the chemicals into a mixing vat.

The embodiments can uniquely move the automated mixing assembly vertically enabling the auger to connect linearly with preexisting fractionation equipment connected to the mixing vat, providing a safer robot preventing environmental spills and toxic exposure due to a limited number of connection parts and joints.

The embodiments can be moved easily between wells for different jobs, and the model allows for storage of many types of dry chemicals to accommodate different types of fluids needed for different wells.

While these embodiments have been described with emphasis on the embodiments, it should be understood that within the scope of the appended claims, the embodiments might be practiced other than as specifically described herein.

What is claimed is:

1. An automatic height adjusting robot computing controlled volumetric ratios of dry chemicals while connected to a production well, comprising:

a. a base frame comprising:
  i. a first parallel support member and a second parallel support member;
  ii. a cross member connected between the first and second parallel support members;
  iii. a first pivoting wheel aligned with a first fixed wheel mounted on the first parallel support member;
  iv. a second pivoting wheel aligned with a second fixed wheel mounted on the second parallel support member;
b. an L-shaped lifting base assembly removably disposed on the base frame comprising:
  i. a base plate;
  ii. a back plate mounted at an angle from 80 degrees to 100 degrees to the base plate;
  iii. a pair of sliding engagement extensions mounted to the back plate;
  iv. a lifting eyelet mounted to the back plate between the pair of sliding engagement extensions;
c. a lifting frame mounted to the base frame at an angle from 80 degrees to 100 degrees from a base plane configured to receive the pair of sliding engagement extensions forming a secure connection with the L-shaped lifting base assembly;
d. a hoist assembly engaging the lifting eyelet to raise and lower the L-shaped lifting base assembly off the base frame;
e. an automated mixing assembly fastened to the L-shaped lifting base assembly, the automated mixing assembly comprising:
  i. an outer housing secured to the L-shaped lifting base assembly;
  ii. a tapered mixing chamber installed in the outer housing;
  iii. a mixing controller comprising:
    (1) a processor connected to a display;
    (2) a computer readable medium comprising:
      (a) a volumetric ratio model providing zero-lag estimates of volumetric ratios of dry chemicals to form a volumetric ratio of dry chemicals automatically;
      (b) computer instructions to instruct the processor to present a feed rate for dry chemicals entering the automated mixing assembly using a first volumetric ratio of dry chemicals from the volumetric ratio model to the display;
      (c) computer instructions to instruct the processor to dynamically re-compute the volumetric ratio of dry chemicals automatically and present the changed volumetric ratio to the display by changing at least one of:
        (i) a quantity of a first dry chemicals flowing into the tapered mixing chamber;
        (ii) a quantity of a second dry chemicals flowing into the tapered mixing chamber;
        (iii) a preset flow rate of chemicals flowing out of the tapered mixing chamber;
f. a power inlet connected to a power supply engaging the outer housing and electrically connected to the mixing controller; and
g. a screw conveyor extending from the tapered mixing chamber to an outlet.

2. The automatic height adjusting robot of claim 1, comprising: a first wheel support member mounted between the first parallel support member and the first pivoting wheel and the first fixed wheel and a second wheel support member mounted between the second parallel support member and the second pivoting wheel and the second fixed wheel.

3. The automatic height adjusting robot of claim 1, wherein the lifting frame comprising:
   a. a crown;
   b. a first lifting member with a first groove connected to the cross member; and
   c. a second lifting member with a second groove connected to the cross member in a spaced apart relationship and wherein each groove is adapted to receive the pair of sliding engagement extensions.

4. The automatic height adjusting robot of claim 3, wherein the hoist assembly comprises:
   a. a sheave mounted to the crown;
   b. a winch mounted between the first and second lifting members; and
   c. a cable extending from the winch through the sheave to the lifting eyelet.

5. The automatic height adjusting robot of claim 1, wherein the outer housing and the L-shaped lifting base assembly are an integral one piece assembly.

6. The automatic height adjusting robot of claim 1, comprising:
   an outer lid for closing the outer housing.

7. The automatic height adjusting robot of claim 1, comprising:
   an inner lid for closing the tapered mixing chamber.

8. The automatic height adjusting robot of claim 1, comprising a plurality of legs extending from the outer housing toward the base plate for fastening the outer housing to the L-shaped lifting base assembly.

9. The automatic height adjusting robot of claim 8, comprising a first side plate and a second side plate mounted in parallel and connected on opposite sides of the base plate, each side plate configured to support and secure to at least two legs of the plurality of legs of the outer housing.

10. The automatic height adjusting robot of claim 9, comprising a plurality of bolts, each bolt of the plurality of bolts for securing at least two legs of the plurality of legs to the first side plate and the second side plate.

11. The automatic height adjusting robot of claim 1, wherein the automated mixing assembly is in communication with a network and a plurality of client devices are in communication with the network for automatically controlling volumetric ratios of dry chemicals flowing into the production well.

* * * * *